United States Patent
Gillet et al.

(10) Patent No.: US 10,380,437 B2
(45) Date of Patent: Aug. 13, 2019

(54) SYSTEMS AND METHODS FOR TRAFFIC SIGN ASSISTANCE

(71) Applicant: TOYOTA MOTOR EUROPE, Brussels (BE)

(72) Inventors: Christophe Gillet, Brussels (BE); Tomoya Kawasaki, Brussels (BE); Yuzo Kaneshige, Auderghem (BE); Tom Rycken, Brussels (BE); Tomoya Sano, Brussels (BE)

(73) Assignee: TOYOTA MOTOR EUROPE, Brussels (BE)

( * ) Notice: Subject to any disclaimer, the term of this patent is extended or adjusted under 35 U.S.C. 154(b) by 0 days.

(21) Appl. No.: 15/518,258

(22) PCT Filed: Oct. 14, 2014

(86) PCT No.: PCT/EP2014/072058
§ 371 (c)(1),
(2) Date: Apr. 11, 2017

(87) PCT Pub. No.: WO2016/058634
PCT Pub. Date: Apr. 21, 2016

(65) Prior Publication Data
US 2017/0308761 A1    Oct. 26, 2017

(51) Int. Cl.
*G06K 9/00* (2006.01)
*G08G 1/16* (2006.01)
*G06K 9/62* (2006.01)

(52) U.S. Cl.
CPC ....... *G06K 9/00818* (2013.01); *G06K 9/6215* (2013.01); *G08G 1/165* (2013.01); *B60R 2300/302* (2013.01)

(58) Field of Classification Search
CPC .. G06K 9/00818; G06K 9/6215; G08G 1/165; B60R 2300/302
See application file for complete search history.

(56) References Cited

U.S. PATENT DOCUMENTS

| 6,801,638 | B1 | 10/2004 | Janssen et al. |
| 7,058,206 | B1 | 6/2006 | Janssen et al. |
| 9,436,879 | B2 * | 9/2016 | Zobel ................ G06K 9/00818 |
| 9,697,430 | B2 * | 7/2017 | Kristensen ......... G06K 9/00818 |
| 2009/0088978 | A1 * | 4/2009 | Ishikawa .............. G01C 21/26 701/514 |

(Continued)

FOREIGN PATENT DOCUMENTS

| DE | 29610677 U1 | 9/1996 |
| DE | 19829162 A1 | 1/2000 |

(Continued)

OTHER PUBLICATIONS

Jun. 15, 2015 International Search Report in International Patent Application No. PCT/EP2014/072058.

(Continued)

*Primary Examiner* — Katrina R Fujita
(74) *Attorney, Agent, or Firm* — Oliff PLC

(57) ABSTRACT

A traffic sign assistance system for a vehicle including optical recognition unit to obtain data regarding a regulation indicator in proximity to the vehicle, at least one sensor unit configured to monitor a vehicle travel direction, and processing unit. The processing unit are configured to determine a location of a location of a next road intersection based on the vehicle travel direction, measure a distance between a location of the regulation indicator and the location of the next road intersection, cause display of a regulation value associated with the regulation indicator on a display device to be maintained if the distance is less than a predetermined threshold value and a change in vehicle travel direction is detected, and hide the regulation value associated with the regulation indicator from the display device if the distance is greater than the predetermined threshold value and a change in vehicle travel direction is detected.

12 Claims, 3 Drawing Sheets

(56) References Cited

U.S. PATENT DOCUMENTS

| | | | | |
|---|---|---|---|---|
| 2009/0303077 A1* | 12/2009 | Onome | ............ | G08G 1/096716 340/901 |
| 2009/0312888 A1* | 12/2009 | Sickert | ................ | G08G 1/0962 701/1 |
| 2010/0292895 A1* | 11/2010 | Nakamura | ......... | G08G 1/09623 701/41 |
| 2010/0302361 A1* | 12/2010 | Yoneyama | ......... | G06K 9/00818 348/135 |
| 2012/0046855 A1 | 2/2012 | Wey et al. | | |
| 2013/0163865 A1* | 6/2013 | Sato | ................... | G01C 21/3602 382/165 |
| 2016/0267332 A1* | 9/2016 | Tsushima | ............. | G06K 9/3258 |

FOREIGN PATENT DOCUMENTS

| | | |
|---|---|---|
| DE | 19852631 A1 | 5/2000 |
| DE | 10 2004 042382 A1 | 3/2006 |
| EP | 1131803 B1 | 6/2002 |
| EP | 1826736 B1 | 5/2008 |
| JP | 2007-17010 A | 1/2007 |
| JP | 2008-299570 A | 12/2008 |
| JP | 2009-187166 A | 8/2009 |
| JP | 2010-282278 A | 12/2010 |
| JP | 2012-185076 A | 9/2012 |
| JP | 2012-248111 A | 12/2012 |
| JP | 2013-250239 A | 12/2013 |

OTHER PUBLICATIONS

Jun. 15, 2015 Written Opinion in International Patent Application No. PCT/EP2014/072058.

Jan. 8, 2019 Office Action issued in Japanese Patent Application No. 2017-520510.

Jul. 3, 2018 Office Action issued in Japanese Patent Application No. 2017-520510.

\* cited by examiner

SYSTEMS AND METHODS FOR TRAFFIC SIGN ASSISTANCE

FIELD OF THE DISCLOSURE

The present disclosure is related to systems and methods for road sign recognition, and more particularly, to improve road sign validity indications.

BACKGROUND OF THE DISCLOSURE

Various systems exist for providing assistance to drivers of motor vehicles. For example, one such area of assistance relates to automated road sign recognition.

Road sign recognition may be accomplished by using suitable devices (e.g., optical devices such as a camera) for perceiving or detecting the surroundings of a motor vehicle. Systems are available commercially, for example, both from automobile manufacturers, and from manufacturers of portable navigation devices (PNDs). The PND systems are based on GPS signals and map data for supplying the driver with information relating to road signs.

Some existing systems implement a camera device for improving recognition accuracy and robustness. The manufacturers of vehicles use front-mounted camera devices and means for combining signals with data relating to the driving state of the vehicle. A further option is means for combining signals with navigation devices.

In such systems certain issues exist such as, for example, how long to maintain display of a particular regulation value to the driver (i.e., how long is such a value relevant), what to do when multiple indicators are recognized in succession, and how should a vehicle change in direction or crossing of an intersection affect display of the regulation value.

US 2012/046855 discloses systems methods for recognizing road signs. An image of a road sign is captured by least one image sensor. A vehicle computer receives the image data representing one or more road signs along a route and displays one or more images of the road sign based on the image data. The display is capable of presenting one or more status of the road sign based on one or more travel states for the vehicle such as an amount of elapsed travel time, distance travelled, or speed.

EP 1 826 736 B1 discloses a vehicle having a controller for determining a road sign and/or regulation content of the road sign, where the road sign is covered in a camera picture. A display is provided for displaying a representation of the road sign or an information about the regulation content. The display is changeable between two output formats, which have smaller and higher probabilities of road sign determination, respectively. A monochrome or grey value representation takes place in one output format, and a colored representation takes place in another output format.

EP 1 131 803 B1 discloses a device and a method enabling traffic signs to be recognized and displayed to an observer in the form of a memory aid. The reject rate with respect to the recognition of objects that are recognized as traffic signs remains low. Image data from an image sensor is analyzed and classified in an information processing unit. Image sections and/or image data corresponding to a symbolic representation stored in a memory unit is/are archived in a memory unit and represented by means of a display unit on the basis of classification results. When the image data is further processed, the extracted objects are separated into specific classes and sub-classes of traffic-signs and classified. A synthetic image of a traffic sign is generated, stored in a memory unit and displayed by means of a display unit.

DE 296 10 677 U1 discloses a system for displaying road signs, the system having, in addition to a display for displaying messages to the driver, a signal transmitter which activates the display as a function of the distance traveled, and makes the display visible or invisible.

DE 198 29 162 A1 discloses the use of an electronic camera and of an image recognition device cooperating therewith, for the purpose of recognizing road signs, wherein the image recognition device can be reset to its starting state if, the vehicle turns off the road, for example after a road sign indicating a speed limit.

SUMMARY OF THE DISCLOSURE

The present inventors have recognized that according to the laws of some jurisdictions, a regulation indicator appearing within a predetermined threshold distance of an intersection apply both to the area immediately following the regulation indicator, as well as the road intersecting (i.e., the crossroad) at the intersection. In other words, if the vehicle turns onto the intersecting road, the regulation indicator remains valid. However, prior available systems have not accurately displayed valid regulation values associated with such indicator configurations.

Therefore, the present configurations are directed to solving this problem.

According to embodiments of the present disclosure, a traffic sign assistance system for a vehicle is provided including optical recognition means configured to obtain data regarding a regulation indicator in proximity to the vehicle, at least one sensor means configured to monitor a vehicle travel direction, and processing means. The processing means are configured to determine a location of a location of a next road intersection based on the vehicle travel direction, measure a distance between a location of the regulation indicator and the location of the next road intersection, cause display of a regulation value associated with the regulation indicator on a display device to be maintained if the distance is less than a predetermined threshold value and a change in vehicle travel direction is detected, and hide the regulation value associated with the regulation indicator from the display device if the distance is greater than the predetermined threshold value and a change in vehicle travel direction is detected.

By providing such a system regulations associated with certain jurisdictions may be taken into consideration when evaluating the validity of regulation indicators. In addition, it may be possible to better inform a driver of a vehicle as to the regulation value currently in effect.

The at least one sensor means may include a steering wheel position sensor and the next road intersection may be detected based on the at least one sensor.

The processing means may be configured to reset the measured distance to zero upon detection of a second regulation indicator prior to the next road intersection.

The regulation value may preferably be a speed limit.

The processing means may be configured to maintain display of the regulation indicator after a change in direction of the vehicle indicated by the state information, only when the distance is less than the predetermined threshold value.

According to further embodiment of the present disclosure, a method for providing driver assistance is provided. The method includes receiving data regarding a regulation indicator in proximity to the vehicle and a next road intersection, tracking a distance travelled from the regulation indicator to a location of a next road intersection, monitoring a vehicle travel direction, displaying a regulation value associated with the regulation indicator when the distance travelled is less than a predetermined threshold value and a change in vehicle travel direction is detected, and hiding the regulation value associated with the regulation indicator when the distance travelled is greater than a predetermined threshold value and a change in vehicle travel direction is detected.

The method may include monitoring state information related to a state of the vehicle to detect a vehicle turn, wherein the state information comprises at least one of a vehicle speed and a steering wheel position.

The next road intersection may be detected based on the state information.

The method may include resetting the measured distance to zero upon detection of a second regulation indicator prior to the next road intersection.

The regulation value may preferably be a speed limit.

The method may include maintaining display of the regulation indicator after a change in direction of the vehicle only when the distance is less than the predetermined threshold value.

According to still further embodiments of the present disclosure, traffic sign assistance system for a vehicle is provided. The system includes a camera configured to obtain data regarding a regulation indicator in proximity to the vehicle, at least one sensor configured to monitor a vehicle travel direction, and an ECU. The ECU is configured to determine a location of a next road intersection based on the vehicle travel direction, measure a distance between a location of the regulation indicator and the location of the next road intersection, cause display of a regulation value associated with the regulation indicator on a display device to be maintained if the distance is less than a predetermined threshold value and a change in vehicle direction is detected, and hide the regulation value associated with the regulation indicator from the display device if the distance is greater than the predetermined threshold value and a change in vehicle direction is detected.

The at least one sensor may include a steering wheel position sensor and the next road intersection may be detected based on the sensor.

The ECU may be configured to reset the measured distance to zero upon detection of a second regulation indicator prior to the next road intersection.

The regulation value may preferably be a speed limit.

The ECU may be configured to maintain display of the regulation indicator after a change in direction of the vehicle indicated by the state information, only when the distance is less than the predetermined threshold value.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
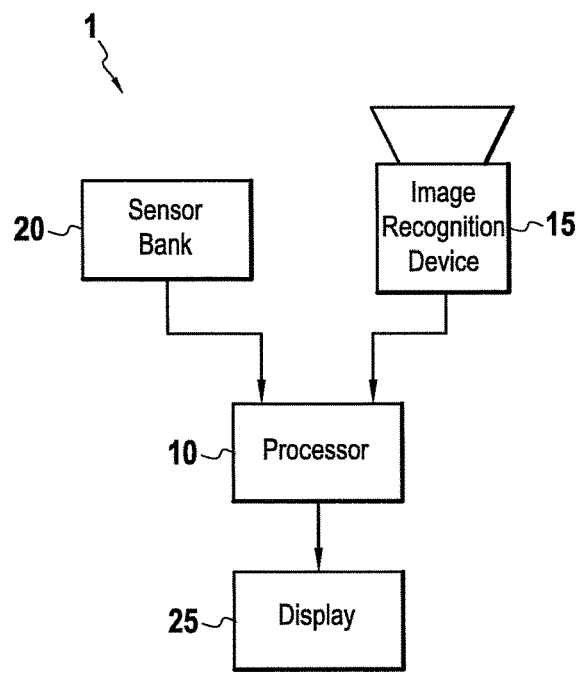
FIG. 1 shows an exemplary driver assistance system according to embodiments of the present disclosure.

FIG. 1 shows an exemplary driver assistance system 1 according to embodiments of the present disclosure. The driver assistance system 1 may include processing means, such as an electronic control unit (ECU) 10, image obtaining means 15 such as a camera, one or more sensors 20, and a display 25 among others. According to some embodiments, a global positioning system may be optionally provided, as desired, for example to provide additional data regarding location and maps to ECU 10.

Image obtaining means 15 may include, for example, one or more cameras and/or other suitable devices configured to obtain optical data from an area surrounding a vehicle (e.g., in front of a forward moving vehicle). Image obtaining means 15 may be configured to process the data obtained from the surroundings of the vehicle to determine the existence of regulation indicators 50 (e.g., road signs such as a speed limit sign, a zone indicator sign, among others), and road intersections 55 (i.e., crossroads where a vehicle may either turn onto the crossroad, or continue straight on the current road). Such image obtaining means 15 are known in the art, and one of skill in the art will understand that any such image obtaining means 15 may be implemented in the present system without departing from the scope of the present disclosure.

Image obtaining means 15 may be located on a vehicle 2 so as to provide an adequate field of view 4 of the surroundings of the vehicle 2 (e.g. a front and side view spanning approximately 180 degrees). For example, one or more image obtaining means 15 may be located behind the windshield, on a front bumper, a side view mirror, rearview mirror, and/or other suitable mounting location on the vehicle 2 so as to provide a field of view 4 of approaching regulation indicators 50 and intersections 55 near the vehicle. According to some embodiments it may be desirable to minimize visibility of image obtaining means 15 for aesthetic reasons, and one of skill in the art will understand that finding a mounting location suitable to achieve this goal while also providing adequate field of view surrounding the vehicle 2 to be a reasonable consideration.

The term "adequate" when referring to field of view as used herein shall mean a field of view providing image obtaining means 15 with the ability to identify regulation indicators 50 present on the road surrounding the moving vehicle and to display information related to said regulation indicators to a driver of the vehicle on display 25 with a success rate for identification of at least 99.9 percent.

Image obtaining means 15 may be configured to provide data regarding surroundings of a vehicle 2, including regulation indicators 50 and intersecting roads 21 to ECU 10. Such data may include, for example a regulation value (e.g. a speed limit and/or a zone indicator). Image obtaining means 15 may provide such data to ECU 10 via a wired connection, a wireless connection, or other suitable method for transferring data to ECU 10. For example, image obtaining means 15 may include wireless communication means (e.g. IEEE 802.11 compliant Wi-Fi hardware) for transmitting data to ECU 10 and/or other devices that may use the data from image obtaining means 15. Alternatively or in addition, for example for safety purposes, a wired connection may be provided. Such a wired connection may be provided, for example, to provide failsafe in a case where a wireless connection should cease to function.

When obtaining data related to a regulation indicator, image obtaining means 15 may be configured to assign a time indicator (e.g., a timestamp) and/or position indicator (e.g., coordinate information) to the data. Alternatively, ECU 10 may be configured to assign a time indicator to the data upon receipt from image obtaining means 15. By assigning a time indicator to data obtaining by image obtaining means 15, an age of the data (i.e., time elapsed since a regulation indicator was identified by image obtaining means 15) may be tracked by ECU 10, among others.

One or more sensors 20 may be configured to transmit state information related to a state of the vehicle to ECU 10. For example, a state of the vehicle may include a speed at which the vehicle is traveling, a direction in which the vehicle is traveling, a change of direction which the vehicle is undergoing and/or has undergone, a position of the steering wheel, a distance which the vehicle has traveled, etc.

Therefore, one or more sensors 20 may include, for example, a steering wheel position sensor, a vehicle speed sensor, a yaw rate sensor, among others. Such sensors, similarly to image obtaining means 15, may be configured to provide such state information wirelessly and/or by wire to ECU 10, and may further include duration information. Duration information associated with the state information may be tracked by ECU 10.

ECU 10 may include any suitable device configured to manipulate data, perform calculations, execute code for decision making, and causing display of information to an operator of vehicle 2, in order to carry out embodiments of the present disclosure. For example ECU 10 may include various analog and/or digital circuits, and may include integrated circuits such as RISC processors, i386 processors, ASIC processors, etc. Typically, on-board computers in modern vehicles include such processors, and one of skill will understand that the present ECU 10 may be comprised by such an on-board computer, or may be separately provided. One of skill in the art will also understand that the exemplary circuits and processors described herein are not intended to be limiting, and that any suitable device may be implemented.

ECU 10 may be linked to one or more databases and/or other memory (e.g., RAM, ROM, etc.) associated with vehicle 2 so as to enable storage of vehicle related data as well as values that may be utilized during processing of vehicle functions (e.g., threshold values), such as regulation indicator validation. One of skill in the art will recognize that information discussed herein with regard to any such databases and/or memory is not intended to be limiting.

ECU 10 may be configured to receive data from image obtaining means 15 and one or more sensors 22 providing functionality associated with the present disclosure. For example ECU 10 may receive data regarding regulation indicators from image obtaining means 15 and one or more sensors simultaneously (e.g., streaming data). Such data may include, for example, a speed limit and/or intersection information.

ECU 10 may therefore include one or more means for receiving the data from image obtaining means 15 and the state information from one or more sensors 22. For example ECU 10 may be linked to one or more interfaces, e.g. network interfaces, which may be configured to receive wirelessly and/or by wire the data in the state information, among others.

Figure 3A:
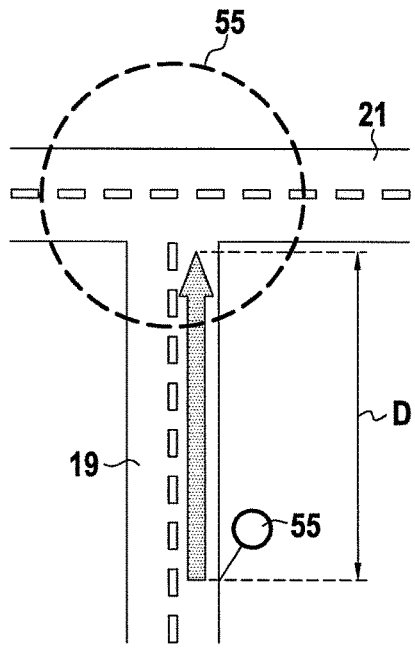
FIGS. 3A-3C are diagrams representing exemplary situations implementing the driver assistance system according to FIG. 1.
Figure 3B:
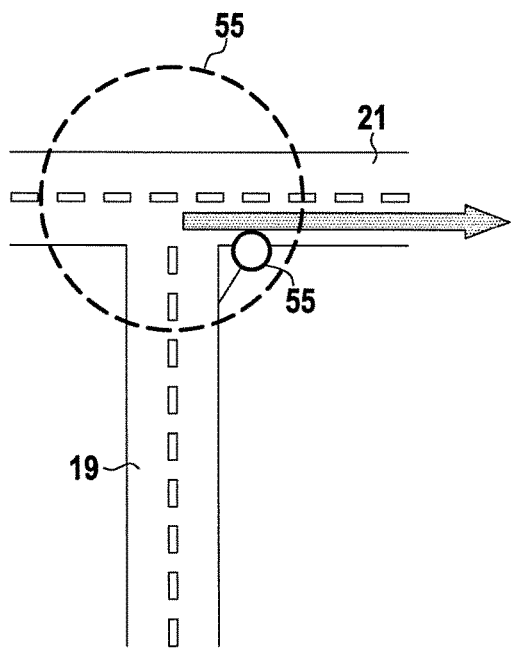
Figure 3C:
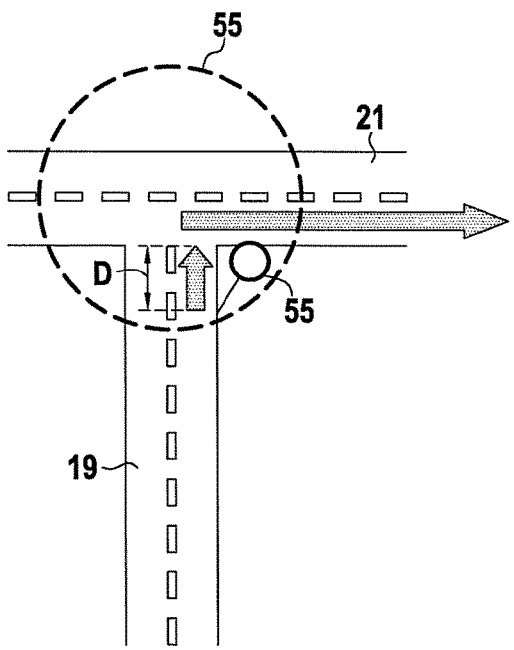

Based on the data and the state information provided to ECU 10, ECU 10 may be configured to perform various operations for confirming or revoking validity of a regulation value associated with an identified regulation indicator 50, among others. For purposes of explaining embodiments of the present disclosure an example using a speed limit sign 50 and intersection 55 as shown at FIGS. 3A-C will be described. One of skill in the art will understand, however, that this is merely exemplary and not intended to be limiting.

Figure 2:
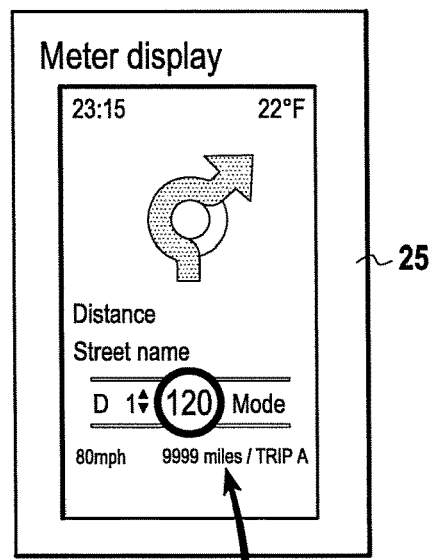
FIG. 2 is a diagram representing an exemplary vehicle including the driver assistance system of claim 1 while on the road.
Figure 2:
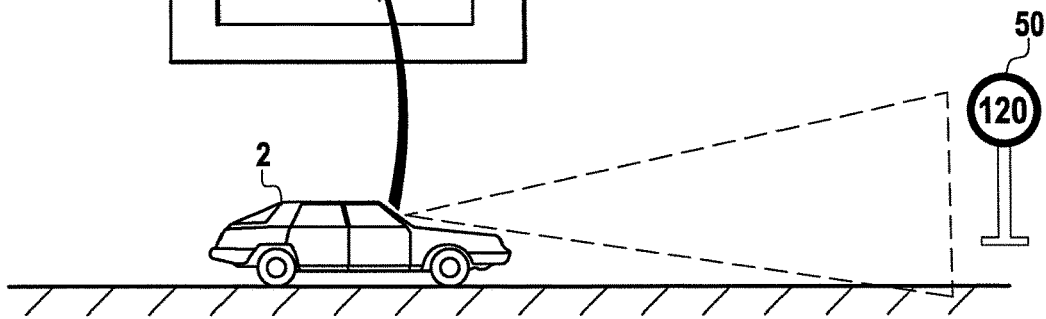

Display 25 may be configured to display information provided by ECU 10 to a driver of vehicle 2. FIG. 2 shows an exemplary display 25 providing information that may be of interest to a driver of vehicle 2. As shown at FIG. 2, a valid speed limit is among the information currently displayed to a driver on display 25.

Display 25 may be any suitable device for providing visible and/or audible information to a driver of vehicle 2. For example, display 25 may include a heads up display (e.g., on a windshield in front of a driver), a monitor, an in-dash display, etc.

Figure 4:
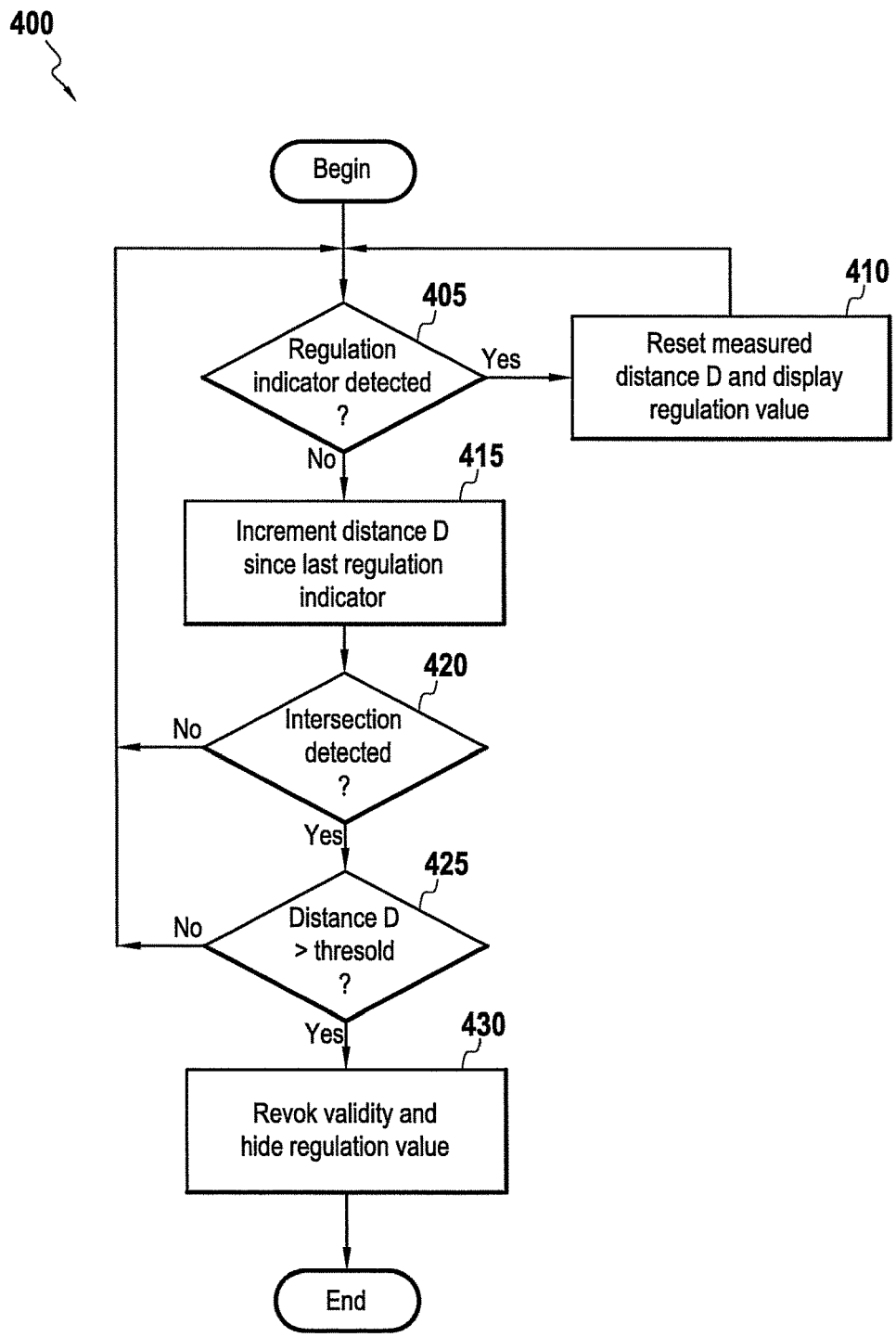
FIG. 4 is a flowchart highlighting an exemplary method for carrying out embodiments of the present disclosure.

FIG. 4 is a flowchart highlighting an exemplary method for carrying out embodiments of the present disclosure and may be better understood by referring also to FIGS. 3A-C.

As vehicle 2 travels along road 19 a distance D since recognition of the latest regulation indicator may be tracked by ECU 10. Upon detection of a regulation indicator 50 by image obtaining means 15 (step 405: yes), a regulation value distance D may be reset to zero or other suitable value for which ECU 10 may be configured to recognize that a newly identified regulation indicator 50 has been detected. For example, a speed limit sign located along road 19 may be detected by a forward facing camera associated with vehicle 2, and distance D reset to zero (step 405: yes).

ECU 10 may then continue tracking distance D from the detected regulation indicator 50, and may continue to monitor for an intersection 55 (i.e. the crossroad 21) (step 415). For example, ECU 10 may monitor information received from one or more sensors 20 and/or image obtaining means 15 to determine the existence of an intersection 55 (e.g., indication of a turned steering wheel, image recognition of crossroads, etc.). For example, where vehicle 2 changes direction (e.g., based on information received from a steering wheel position indicator) it may be determined that an intersection 55 has occurred. Upon detection of such an intersection 55 (step 420: yes), ECU 10 may check whether distance D (which is the tracked distance between the regulation indicator 50 and crossroad 21) is greater than a predetermined threshold value stored in memory associated with ECU 10 (step 425).

When it is determined that the distance D is greater than the predetermined threshold value (step 425: yes) validity of the regulation indicator 50 is provisionally revoked until it is determined whether vehicle 2 makes a turn onto crossroad 21 (step 427), for example, as determined by a signal from a steering wheel position sensor. If vehicle 2 turns onto crossroad 21 (step 427: yes) and validity of regulation indicator 50 has been provisionally revoked, display of a regulation value associated with the regulation indicator 50 is removed (e.g. hidden) from display 25. Alternatively, when it is determined that the distance D does not exceed the predetermined threshold distance (step 425: no) and that vehicle 2 has turned onto crossroad 21 (step 427: yes), ECU 10 continues to cause display of the regulation value associated with the detected regulation indicator 50, and returns to awaiting detection a second regulation indicator 50, or next intersection 55, even after ECU 10 receives an indication (e.g. from one or more sensors 20) that vehicle 2 has made a turn onto crossroad 21.

Where vehicle 2 continues straight across the crossroad 21, without making a turn onto crossroad 21, and a regulation indicator 50 was detected within a distance D less than the threshold value, ECU 10 may cause the display 25 to display the previously recognized regulation indicator 50 that occurred immediately prior to the regulation indicator 50 detected before the intersection 55. In other words, in such a scenario, a speed limit in effect for the current road 19 will remain displayed on display 25.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A method for providing driver assistance, comprising:
   receiving image data regarding a regulation indicator in proximity to the vehicle and a next road intersection;
   tracking a distance traveled between the regulation indicator to a location of the next road intersection, based on the image data;
   monitoring a vehicle travel direction;
   displaying a regulation value associated with the regulation indicator when the distance traveled is less than a predetermined threshold value and a change in vehicle travel direction is detected; and
   hiding the regulation value associated with the regulation indicator when the distance traveled is greater than a predetermined threshold value and a change in vehicle travel direction is detected.

2. The method for providing driver assistance according to claim 1, comprising monitoring state information related to a state of the vehicle to detect a vehicle turn, wherein the state information comprises at least one of a vehicle speed and a steering wheel position.

3. The method for providing driver assistance according to claim 2, wherein the next road intersection is detected based on the state information.

4. The method for providing driver assistance according to claim 2, comprising maintaining display of the regulation indicator after a change in direction of the vehicle only when the distance is less than the predetermined threshold value.

5. The method for providing driver assistance according to claim 1, comprising resetting the measured distance to zero upon detection of a second regulation indicator prior to the next road intersection.

6. The method for providing driver assistance according to claim 1, wherein the regulation value is a speed limit.

7. A traffic sign assistance system for a vehicle, comprising:
   a camera configured to obtain data regarding a regulation indicator and road intersections in proximity to the vehicle;
   at least one sensor configured to monitor a vehicle travel direction;
   an ECU configured to:
   determine a location of a next road intersection based on the vehicle travel direction and the data obtained by the camera;
   track a distance between a location of the regulation indicator and the location of the next road intersection;
   cause display of a regulation value associated with the regulation indicator on a display device to be maintained if the distance is less than a predetermined threshold value and a change in vehicle direction is detected; and
   hide the regulation value associated with the regulation indicator from the display device if the distance is greater than the predetermined threshold value and a change in vehicle direction is detected.

8. The driver assistance system according to claim 7, wherein the at least one sensor comprises a steering wheel position sensor.

9. The driver assistance system according to claim 8, wherein the next road intersection is detected based on the sensor.

10. The driver assistance system according to claim 7, wherein, the ECU is configured to reset the measured distance to zero upon detection of a second regulation indicator prior to the next road intersection.

11. The driver assistance system according to claim 7, wherein the regulation value is a speed limit.

12. The driver assistance system according to claim 7, wherein the ECU is configured to maintain display of the regulation indicator after a change in direction of the vehicle indicated by the state information, only when the distance is less than the predetermined threshold value.

* * * * *